July 25, 1961
B. CLAASSEN
2,993,417
METHOD AND APPARATUS FOR MACHINING THE ENDS OF THE TEETH
OF GEAR WHEELS AND SIMILAR WORKPIECES
Filed Feb. 3, 1958
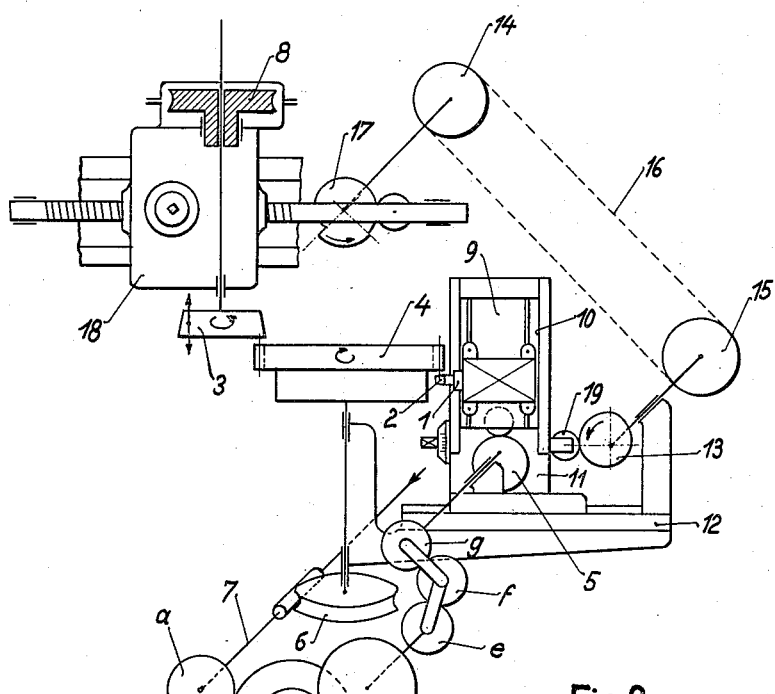
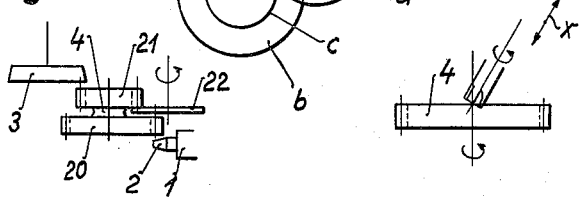
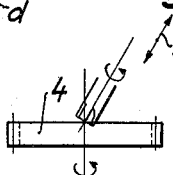
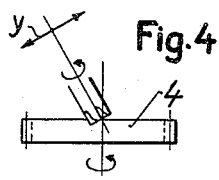
INVENTOR:
Bruno Claassen
By Lowry & Rinehart
ATTYS.

United States Patent Office 2,993,417
Patented July 25, 1961

2,993,417
METHOD AND APPARATUS FOR MACHINING THE ENDS OF THE TEETH OF GEAR WHEELS AND SIMILAR WORKPIECES
Bruno Claassen, Hannover-Bothfeld, Germany
Filed Feb. 3, 1958, Ser. No. 712,888
Claims priority, application Germany Feb. 6, 1957
5 Claims. (Cl. 90—1.4)

In the case of almost all workpieces provided with teeth, such as gear wheels, ratchet wheels, gear couplings, toothed racks, splined shafts and the like, it is necessary to shape the ends of the teeth after the teeth have been cut in a tooth cutting machine by hobbing, slotting or some similar method. In the case of many such workpieces, especially sliding gears and sliding couplings, the ends of the teeth must be given a predetermined shape with the object of facilitating their shifting or engaging when in operation; for example the ends of the teeth must be rounded off, bevelled, set-back or otherwise shaped on one or both edges.

This finishing work is almost always carried out separately from the tooth cutting machine. Only for the machining of bevel-wheels with inclined or hypoidal tooth construction or also spur wheels with helical teeth by the indexing method, it is known to remove on the tooth cutting machine the burr produced on the side on which the cutter moves out by the tooth cutting operation, and to chamfer slightly the sharp tooth edges of helical teeth with the object of removing the superfluous material at this point, but in this case the accuracy of shape, the cutting capacity and the surface quality which the working of engaging edges demands, cannot be attained. In a known bevel wheel gear cutting machine, with the object of removing the burr and breaking or relieving the edges, provision is made for shifting the workpiece in stages in the indexing method, whereby the tools for removing the burrs and breaking the edges are so controlled that they operate alternately with the tooth cutting tools. This means a correspondingly longer total machining time for the workpiece on the gear cutting machine and is open to the objection that the edge-breaking tool also produces a burr which must be subsequently removed.

One of the principal objects of the present invention is to overcome the above-mentioned difficulties and objections and to provide an efficient and novel method for the production of gear wheels with accurately worked tooth ends of desired shape, while at the same time considerably simplifying and lessening the cost of the manufacture of toothed workpieces or blanks.

According to the invention, the method of machining the tooth ends of gear wheels, toothed racks, splined shafts, gear couplings and similar workpieces during a tooth cutting operation, comprises the steps of forming the teeth and shaping the tooth ends by a continuous generating method on one and the same machine and at the same time, the teeth rough-finished by a gear cutting tool being fed to a tool for shaping the tooth ends by the movement of the workpiece, and finish working the teeth by a tooth shaping tool.

An important factor is, that the shaping of the tooth ends takes place simultaneously and continuously during the gear cutting process and that the teeth, after the shaping of the tooth ends has been finally finished, are subjected to a finishing operation by a tooth shaping tool, which is almost always necessary in any case, which tool can with advantage be the same as that which previously cuts the tooth gaps in the workpiece or blank.

The invention enables one to produce toothed workpieces absolutely free from burrs and with the ends of the teeth of any desired shape on one machine, namely a gear cutting machine, in a single operation with extraordinary accuracy and in a shorter time than heretofore and so that they no longer require any finishing work. The time for producing toothed workpieces and the time the workpieces take in passing through the works are considerably reduced, which not only means greater efficiency of the works, but also a considerable reduction in the price of the finished workpieces. Other advantages consist in that the procurement of two or more separate expensive special machines and the high investment costs connected therewith are saved, the space for only one machine is necessary, the driving and servicing expense for the one machine is less than in the case of several machines, the time and expense for moving the workpieces from one machine to another is saved, only one setting up of the workpiece is necessary, and the danger of low-quality goods or waste is reduced.

Another object of the present invention is to provide a gear cutting machine for carrying out the above-mentioned method, which machine comprises in combination with a spindle carrying a gear cutting tool, at least one supplementary spindle controlled and coordinated with the movement of the workpiece, a tool on said supplementary spindle for shaping the ends of the teeth of the workpiece, a control mechanism coordinated to said supplementary spindle to automatically feed the spindle to the work during the tooth cutting operation, to set said supplementary spindle in operation, return it into its initial position and bring it to a standstill after the ends of all the teeth of the workpiece have been shaped, said control mechanism imparting at the same time a stroke movement to said supplementary spindle which added geometrically to the rotary movement of the workpiece effects the shaping of the tooth ends.

The shaping of the ends of the teeth is completely terminated before the tooth-shaping tool subjects to the final or finishing pass each tooth provided with a finished shaped end. Other details of the invention will be hereinafter described with reference to the accompanying drawing in which a gear cutting machine suitable for carrying out the method of the invention is illustrated diagrammatically by way of example.

In the drawing:
FIG. 1 shows all parts of a gear cutting machine necessary for understanding the invention and all parts of an arrangement for working the ends of the teeth;
FIG. 2 shows the working of a workpiece having two gear systems or sets of teeth;
FIG. 3 and FIG. 4 illustrate simultaneous additional working of two inclined surfaces of a toothed gear wheel to be provided with roof-shaped means for facilitating engagement;
FIG. 5a shows a gear wheel in developed state, in which the ends of each two alternating tooth are different, and
FIG. 5b is an end view of one of the teeth of the workpiece according to FIG. 5a provided with a roof-shaped or bevelled end.

In the example illustrated in FIG. 1 an arrangement is shown for the case where there is only one supplementary spindle 1, adjustable in height on a slide 9 in relation to a gear-wheel blank 4, with a milling cutter 2 opposite a tooth cutting tool 3 (pinion type cutter) producing the tooth gaps and displaced by 180° in relation to the latter. It is assumed that the wheel blank 4 is to be provided at the lower end of its teeth, when a burr is formed during the tooth cutting operation, with means for facilitating shifting or engagement. For this purpose the milling cutter 2 must, in passing each tooth, be raised and lowered by an exchangeable lifting surface or cam 5, in the most simple case by an eccentric as illustrated in FIG. 1. The shape worked by the milling cutter 2 is determined by the shape of the lifting cam 5. The slide 9 moves, when in operation, in vertical direction in a guide 10 on an upright 11 which is movable on a horizontal guide on a plate 12.

The lifting cam 5 is positively driven by a hobbing drive effecting the rotation of the workpiece. This drive is derived, for example, from a shaft 7 driving the table carrying the wheel blank 4 through the intermediary of a worm gear 6. The shaft 7 is, in known manner, in a positive ratio of transmission with a worm wheel 8 for rotating the cutting tool 3 through the intermediary of gear parts, not shown, and of change wheels calculated according to the number of teeth of the cutting tool 3 and the wheel blank 4, not shown. The shaft 7 drives the lifting cam 5 through the intermediary of supplementary change wheels $a, b, c, d$ and an articulated wheel bridge $e, f, g$, the purpose of which will be hereinafter described. The transmission ratio $$\frac{a}{b}\frac{c}{d}$$

is generally so determined that the cam 5 carries out as many revolutions during one revolution of the wheel blank as the wheel blank 4 has teeth. The transmission ratio can, however, be so determined that different shapes are worked in groups on the ends of the teeth as shown, merely by way of example, in FIG. 5a. This FIG. 5a shows the development of a toothed wheel with alternating shortened and roof-shaped teeth. FIG. 5b is an end view of one of the roof-shaped or bevelled teeth. Naturally, by suitably shaping the cam 5 the individual teeth of the wheel blank can be given a different shape at their ends; moreover groups of not merely two but of more than two different tooth ends can be obtained.

So that the changing of the workpieces is not impeded by the supplementary spindle or spindles, the upright 11 is in a pulled out position (towards the right in FIG. 1) during the changing of the workpiece. By means of a cam 13, which is driven, for example, by the same shaft as a known feeding cam 17 for a cutting tool carriage 18, in a ratio of 1:1 in the example illustrated, through the intermediary of sprocket wheels 14 and 15 and a chain 16, the upright 11 and with it also the milling cutter 2 receive from the rising race of the cam 13 a feed or setting movement through the intermediary of a roller 19 adjustable radially to the wheel blank for the purpose of setting to the diameter thereof, as soon as the teeth worked by the cutting tool 3 come within the range of the milling cutter 2 through the turning of the wheel blank. During this movement of the upright 11 in the direction towards the axis of the wheel blank the supplementary spindle 1 is switched in by means of an electric switch, not shown in the drawing. When the wheel blank 4 has performed a complete revolution of 360° or turned through slightly more than a complete revolution of 360°, from the point where the milling tool 2 commenced to operate, the upright is returned into its initial position under the action of a load of some kind or a cam, because the race of the cam 13 descends after turning through a certain angle within which it extends in arcuate form concentric to its axis of rotation. During this return movement of the upright 11 into its initial position the power for driving the supplementary spindle 1 is switched off and consequently the milling cutter 2 brought to a standstill.

The arrangement may also be such that the cam 5 is only allowed to become operative while the milling cutter 2 is working. The above-mentioned articulated wheel bridge $e, f, g$ ensures that the connection between the cam 5 and the worm gear 6 always remains in the correct position in relation to the teeth of the cutting tool 3 once it has been set by a truing device not shown. It is evident that this synchronous running can also be attained by means other than those shown in the drawing.

Applying the principles of the method herein described, special machines can also be produced for toothed racks for simultaneously cutting the teeth and shaping the ends thereof. It is likewise possible to construct gear cutting machines in which the teeth of toothed bodies are provided with means for facilitating engagement at both ends. In this case either a double supplementary spindle with spindles displaced by half a tooth pitch is provided or an additional supplementary spindle is arranged in the free space between the tooth cutting tool 3 and the above-described supplementary spindle, or the ends of neighboring teeth can be alternately worked on opposite sides with only one spindle. Finally, it is likewise possible to work with supplementary spindles controlled in opposite directions on the same upright.

Frequently wheel bodies with several sets of teeth or gear systems have to be worked. FIG. 2 shows by way of example a wheel body having a set of teeth 20 and a set of teeth 21. The set of teeth 20 having a larger diameter can be worked, for example, by the hobbing method, whereas the set of teeth 21 with the smaller diameter must be slotted. By a suitable choice of the ratio of transmission in the change wheels $a, b, c, d$, the set of teeth 20 which has been previously hobbed can be worked with the supplementary spindle 1, whereas the other set of teeth 21 having a different or the same number of teeth as the set of teeth 20 is worked at the same time by the cutting tool 3. In the same operation the burrs on the set of teeth 21 can also be removed by means of a slotting cutter 22 which does not participate in the lifting movement and in addition these teeth can also be provided at their upper ends by another supplementary spindle with means for facilitating shifting or engagement or the edges of these teeth can be broken or bevelled.

If one of the supplementary spindles is constructed as a generating shaping spindle, it can, if set at an incline or in slanting position, be used for working the ends of the teeth or, if it is in a parallel position, for breaking or chamfering the edges of the tooth heads or otherwise for working a second set of teeth on the wheel body provided with several sets of teeth or gear systems.

By means of two end milling cutters it is also possible to provide the tooth ends with surfaces inclined to each other, for example in inverted V-shape or chamfered, as is shown by way of example in FIGS. 3 and 4. The supplementary spindles are then set in slanting axial positions and, instead of carrying out the stroke movements described above, can be moved in the axial direction of the spindles indicated by an arrow $x$ in FIG. 3 or transversely thereto as indicated by an arrow $v$ in FIG. 4 by means of cam drives with intermittent feed so that they work the ends of the teeth exclusively at the desired places.

If the supplementary spindle or spindles are equipped for radial intermittent feed and if in addition a transverse movement, especially one along an arcuate line about the axis of the wheel blank and spring-back movement is provided, spiral drills can be employed instead of milling cutters 2 for drilling, for example, oil holes between the teeth or (in this case before the tooth cutting operation) holes as run-outs for the teeth of the cutting tool, if it is not possible to provide a perforation for the run-out of the cutting tool. When wheel blanks are clamped in packs, it is possible to use, instead of a spiral drill, several form burring reamers, similar to centering drills, arranged one below the other in the width of the wheel, so as to form simultaneously means for facilitating shifting or engagement or bevels on one or both sides of all the wheels in the pack during the tooth cutting operation.

When shaping helical, and in particular short toothed racks by the generating method, these racks are clamped in known manner slanting so that straight toothed cutter wheels can be employed. If such helical toothed racks are to be provided with means for facilitating engagement or to be burred, it is possible to clamp at the same time with the racks set at an incline, toothed racks already provided with teeth in a straight position (that is with their teeth at a slant). One will then have tooth ends located in the direction of the table movement but with a pitch differing from the toothed racks set at a slant (face pitch instead of normal pitch). By suitably selecting the change wheels *a, b, c, d* they can then be worked simultaneously by the tooth cutting process with the aid of the supplementary spindle 1.

In the case of hobbing gear wheels, the supplementary spindle can also be equipped with synchronously running hobs; the supplementary spindle can then be displaced in relation to the hob shaping the teeth or can be arranged above or below the latter and in this case also have a common drive with the hob which shapes the teeth.

While the method herein described, and the apparatus used for carrying out this method into effect constitute preferred embodiments of the invention, it is to be understood that the invention is not limited to this precise method and apparatus, and that changes may be made in either without departing from the scope of the invention which is defined in the appended claims.

Thus, for instance, it is evident that, instead of the axial position of the workpiece being vertical as described and illustrated in the drawing, the axial position of the wheel blank 4 can be horizontal or as desired. The supplementary spindles can also be made available for working the tooth ends of internal gearing. Their feeding and return movements can then be initiated by automatic feeler, measuring or control devices of known type, instead of by cams, and carried out for example by hydraulic or pneumatic means.

I claim:

1. A single machine for simultaneously cutting and shaping the teeth of gear wheels and like workpieces comprising in combination a support means for a gear wheel to be worked, at least one profile cutting tool for cutting the flanks of a gear tooth on the gear wheel, at least one end shaping tool for shaping the ends of the gear tooth, separate feed means for each of said tools, and synchronizing means synchronizing the movements of said feed means for the shaping tool with those of the cutting tool, said synchronizing means including means operable to move the end shaping tool away from the gear wheel and simultaneously causing the profile cutting tool to continue to operate whereby the profile cutting tool finishes working the connecting points between the flanks of a tooth and the ends of the tooth to positively remove any burrs produced by the tooth end shaping tool.

2. A machine as defined in claim 1 wherein said synchronizing means includes a plurality of feed cams, one of which controls the movements of the end shaping tool toward and away from the gear wheel and another of which controls the movements of the profile cutting tool toward and away from the gear wheel, said first mentioned cam having such a configuration as to cause the withdrawal of the end shaping tool from the gear wheel prior to that of the profile cutting tool.

3. A machine as defined in claim 1 wherein said last mentioned means includes a cam operable to withdraw said end shaping tool from said gear wheel, the configuration of said cam being a function of the shape given to the ends of the tooth being formed on the gear wheel.

4. A machine as defined in claim 3, including means for actuating said cam, said cam actuating means including a group of change wheels.

5. A machine as defined in claim 4, wherein said cam actuating means are operable independently of said cutting and shaping tools.

References Cited in the file of this patent

UNITED STATES PATENTS

| | | |
|---|---|---|
| 1,410,657 | Colliau | Mar. 28, 1922 |
| 2,184,232 | Christman | Dec. 19, 1929 |
| 2,201,500 | Poock | May 21, 1940 |
| 2,757,577 | Bean et al. | Aug. 7, 1956 |
| 2,871,764 | Seavey | Feb. 4, 1959 |

OTHER REFERENCES

Ser. No. 394,220, Schmid (A.P.C.), published May 4, 1943.